United States Patent [19]

Yamakawa

[11] Patent Number: 5,206,755
[45] Date of Patent: Apr. 27, 1993

[54] OPTICAL BEAM SCANNER
[75] Inventor: Hiromitsu Yamakawa, Omiya, Japan
[73] Assignee: Fuji Photo Optical Co., Ltd., Omiya, Japan
[21] Appl. No.: 770,476
[22] Filed: Oct. 3, 1991
[30] Foreign Application Priority Data
  Oct. 3, 1990 [JP] Japan .................. 2-263751
[51] Int. Cl.$^5$ .................. G02B 26/08; G02B 9/04
[52] U.S. Cl. .................. 359/218; 359/206; 359/217; 359/795
[58] Field of Search .......... 359/205, 206, 212, 213, 359/216, 217, 710, 711, 717, 795, 218

[56] References Cited
U.S. PATENT DOCUMENTS

| | | | |
|---|---|---|---|
| 4,379,612 | 4/1983 | Matsuoka et al. | 359/205 |
| 4,443,055 | 4/1984 | Matsuoka et al. | 359/212 |
| 4,919,502 | 4/1990 | Yamakawa | 359/217 |
| 4,971,411 | 11/1990 | Takanashi | 359/206 |
| 5,015,050 | 5/1991 | Itabashi | 359/206 |
| 5,062,679 | 11/1991 | Itabashi | 359/206 |
| 5,064,261 | 11/1991 | Itabashi | 359/206 |
| 5,136,418 | 8/1992 | Itabashi | 359/216 |

Primary Examiner—Bruce Y. Arnold
Assistant Examiner—James Phan
Attorney, Agent, or Firm—Oblon, Spivak, McClelland, Maier & Neustadt

[57] ABSTRACT

An optical beam scanner capable of correcting irregularities in pitch of beam scanning as caused by inclination or angular deviations of reflective deflection surfaces of a deflector, the scanner including a first image-forming optical system arranged to form an image of a light beam from a light source linearly on or in the vicinity of a reflective deflection surface of a deflector, and a second image-forming optical system arranged to form an image of the deflected light beam from the deflector on a scanning surface. The second image-forming optical system is constituted, successively from the side of the deflector, by a first singular lens element provided with at least one toric surface and having positive refractive power in a plane of transverse main scan direction, and a second singular lens element provided with either a spherical or cylindrical surface and having negative refractive power in the plane of the main scan direction.

8 Claims, 8 Drawing Sheets

SPHERICAL ABERRATION

ASTIGMATISM

DISTORTION

FIG. 4

SPHERICAL ABERRATION

ASTIGMATISM

DISTORTION

FIG. 5

SPHERICAL ABERRATION
F=50

-0.05  0.05

ASTIGMATISM
θ=45.2°

S  T

-5  5

DISTORTION
θ=45.2°

SPHERICAL ABERRATION
F=50

-0.05  0.05

ASTIGMATISM
θ=45.2°

S  T

-5  5

DISTORTION
θ=45.2°

SPHERICAL ABERRATION
F=50
-0.05  0.05

ASTIGMATISM
θ=45.2°
T    S
-5    5

DISTORTION
θ=45.2°
-0.5  0.5%

FIG. 8

SPHERICAL ABERRATION
F=50
-0.05  0.05

ASTIGMATISM
θ=45.2°
S    T
-5    5

DISTORTION
θ=45.2°
-0.5  0.5%

FIG. 9

SPHERICAL ABERRATION

ASTIGMATISM

DISTORTION

FIG. 10

SPHERICAL ABERRATION

ASTIGMATISM

DISTORTION

FIG.11

SPHERICAL ABERRATION
F=50
−0.05   0.05

ASTIGMATISM
θ=45.2°
−5   5

DISTORTION
θ=45.2°
−0.5   0.5 %

FIG.12

SPHERICAL ABERRATION
F=50
−0.05   0.05

ASTIGMATISM
θ=45.2°
−5   5

DISTORTION
θ=45.2°
−0.5   0.5 %

OPTICAL BEAM SCANNER

BACKGROUND OF THE INVENTION

1. Field of the Art

This invention relates to an optical beam scanner suitable for use in laser beam printers, laser-engraving of printing blocks or the like, and more particularly to an optical beam scanner capable of making corrections for irregularities in pitch of beam scanning, which are caused in a direction perpendicular to the transverse scanning direction due to inclination or angular deviations of reflective deflection surfaces like reflecting facets of a polygon mirror.

2. Description of the Prior Art

There has been known in the art an optical laser beam scanner which employs a first image-forming optical system, reflective deflection surfaces on a rotating polygon mirror or the like and a second image-forming optical system (f$\theta$ lens) successively in that order, thereby forming an image of a laser light beam from a light source linearly on or in the vicinity of a reflective deflection surface by the first optical system, scanning the laser beam mechanically by rotation of the polygon mirror, and converging the laser beam through the second optical system to scan a surface in the fashion of the so-called beam spot scanning. A problem with this sort of laser beam scanner is that errors in parallelism of the reflective deflection facets of the polygon mirror with the axis of its rotational center shaft, namely, inclination or angular deviation of the reflective deflection surfaces give rise to irregularities in pitch of beam spot scanning in a direction perpendicular to the transverse main scan direction on the scanning surface or in a subscan direction, giving adverse effects on the picture image of the scanning line picture image.

As countermeasures for such inclination of the reflecting facets or surfaces, there have been proposed various optical means which are designed to correct and improve the facet inclination by optically relocating the reflective defection surface and the scanning surface into conjugative positions.

For example, Japanese Laid-Open Patent Application 48-98844 proposes an optical system which employs, in the second image-forming optical system between a reflective deflection surface and a scanning surface, a spherical lens system having distortion characteristics for realization of uniform speed scanning and an elongated cylindrical lens. Also an optical system which employs a cylindrical mirror in place of the above-mentioned cylindrical lens is disclosed in Japanese Laid-Open Patent Application 61-84620.

However, in case of an optical system which is composed of a spherical lens and an elongated cylindrical lens as in Japanese Laid-Open Patent Application 48-98844, it is necessary to locate the cylindrical lens closely to the scanning surface for correction of field curvature which would otherwise occur in a considerable degree, and to provide a longer cylindrical lens to cover a broader scan width, resulting in a difficulty of arranging the optical system in a compact form. In case the cylindrical lens is substituted with a cylindrical mirror, the degree of field curvature can be improved slightly as compared with that of the cylindrical lens, and the cylindrical mirror can be located at a greater distance from an inspecting surface for the sake of compact construction. However, the cylindrical mirror which serves to turn a light beam is naturally subject to certain positional restrictions inherent to the mirror action.

On the other hand, as shown in U.S. Pat. No. 4,379,612 and Japanese Laid-Open Patent Applications 57-35823 and 63-50814, attempts have been made to realize a compact optical system by incorporating a lens with a corrective toric surface into a lens system with distortional characteristics for uniform speed scanning, dispensing with the elongated cylindrical lens or mirror. In this case, the second image-forming optical system is composed of a couple of lens elements, namely, successively from the side of the reflective deflection surface, a first singular lens element provided with a spherical or cylindrical surface and a second singular lens element provided with a toric surface and having positive refractive power in the plane of scanning. However, with an optical system of this type, it is difficult to shorten further the light path from the scanning optical system to the scanning surface for the purpose of making the apparatus compact because the back focal length of the lens system on the side of the scanning surface becomes longer than the focal length.

SUMMARY OF THE INVENTION

The present invention contemplates to overcome the above-mentioned drawbacks and problems of the prior art, and has as its object the provision of an optical beam scanner which is compact in construction and capable of correcting inclinations of the reflective deflection surfaces.

It is another object of the present invention to provide an optical beam scanner which can reduce the degree of field curvature while maintaining the effect of correcting inclinations of the reflective deflection surfaces in a favorable manner.

In accordance with the present invention, there is provided, for achieving the above-stated objectives, an optical beam scanner of the type including a first image-forming optical system arranged to form an image of a light beam from a light source linearly on or in the vicinity of a reflective deflection surface of a deflector, and a second image-forming optical system arranged to form an image of the deflected light beam from the deflector on a scanning surface, characterized in that the second image-forming optical system is constituted, successively from the side of the deflector, by a first singular lens element provided with at least one toric surface and having positive refractive power in a plane of transverse main scan direction, and a second singular lens element provided with either a spherical or cylindrical surface and having negative refractive power in the plane of the main scan direction.

BRIEF DESCRIPTION OF THE DRAWINGS

The above and other objects, features and advantages of the invention will become apparent from the following description and the appended claims, taken in conjunction with the accompanying drawings which show by way of example a number of preferred embodiments of the invention and in which:

DESCRIPTION OF PREFERRED EMBODIMENTS

Hereafter, the invention is described more particularly by way of the preferred embodiments of the invention, with reference to the accompanying drawings.

Figure 1:
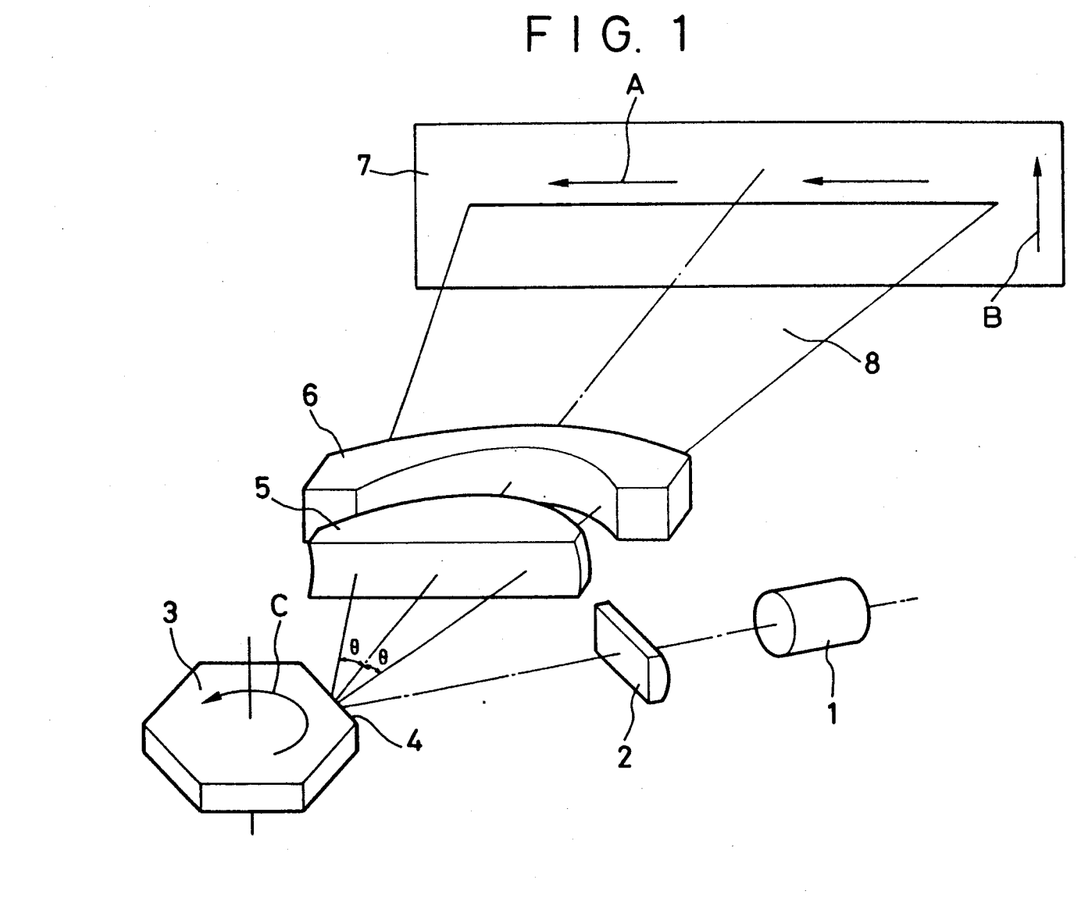
FIG. 1 is a schematic perspective view of an optical beam scanner according to the invention, showing its basic arrangement.

In FIG. 1 which shows the basic lens arrangement of the optical scanner system according to the invention, indicated at 1 is a light source, at 2 is a cylindrical lens employed as a first image-forming optical system which forms a linear image of the light beam from the light source 1, at 3 is a deflector such as a rotary polygon mirror or the like which is located in the vicinity of the linear image formed by the cylindrical lens 2, at 4 reflective deflection surfaces of the deflector 3, at 5 and 6 are singular lens elements of a second image-forming optical system for converging the deflected light beam from the deflector 3 toward a scanning surface 7, and at 8 is a main scanning plane.

A light beam, for example, a laser beam from the light source 1 is linearly imaged on or in the vicinity of a reflective deflection surface 4 of the deflector 3 by the cylindrical lens 2. The light beam deflected by the reflective deflection surface 4 is converged toward the scanning surface 7 through the lens elements 5 and 6 of the second image-forming optical system. The deflector 3 is put in high speed rotation in the direction C to scan the beam spot transversely along the scanning surface 7 in the direction A. At this time, subscanning is effected in the direction B (the subscan direction) perpendicular to the transverse main scan direction A of the scanning surface 7 to form a picture image thereon through photomodulation.

This arrangement allows to minimize the deviations of the scan line, as caused in the subscan direction as a result of inclination or angular deviations of the reflective deflection surfaces, in addition to suppression of field curvature, and to make the back focus of the lens system shorter than its focal length in the scanning plane to reduce the light path length and the scanner size into a more compact form.

In connection with the plane of the transverse main scan direction and the plane of the subscan direction perpendicular to the main scan direction, the second image-forming optical system according to the invention is composed of a first singular lens element 5 provided with at least one toric surface and having positive refractive power in the plane of the main scan direction and a second singular lens element 6 provided with a spherical or cylindrical surface and having negative refractive power in the plane of the main scan direction.

The first singular lens element 5 is preferably provided with a cylindrical or toric surface on the side of the deflector 3 and a toric surface on the side of the scanning surface 7. The term "toric surface" refers to a surface which has different refractive powers in the main scan and subscan directions. The surface on the side of the deflector 3 may be a surface presenting a concave or convex curve or a straight line toward the scanning surface 7 in the plane of the main scan direction. However, the surface on the side of the scanning surface 7 is preferred to present a convex curve toward the scanning surface 7 in the plane of the main scan direction. More specifically, the first singular lens element 5 is preferred to be a meniscus lens having, on the side of the deflector 3, a surface which presents a concave curve toward the deflector 3 in the plane of the subscan direction, and, on the side of the scanning surface 7, a surface which presents a convex curve toward the scanning surface 7 in the plane of the subscan direction.

On the other hand, the second singular lens element 6 is preferred to have a spherical or cylindrical surface both on the side of the deflector 3 and on the side of the scanning surface 7. The second lens element 6 has negative refractive power in the plane of the main scan direction, and preferably has, on the side of the deflector 3, a surface which presents a concave curve toward the deflector 3 in the plane of the main scan direction and, on the side of the scanning surface 7, a surface which presents a convex curve toward the scanning surface 7 in the plane of the main scan direction. In the plane of the subscan direction, the second singular lens element 6 preferably has, on the side of the deflector 3, a surface presenting a concave curve or a straight line toward the deflector 3 and, on the side of the scanning surface 7, a surface presenting a convex curve or a straight line toward the scanning surface 7 in the plane perpendicular to the main scan direction.

In accordance with the present invention, the second image-forming optical system is preferably arranged to satisfy the following condition.

$$0.2 < f_v/f < 0.5$$

wherein $f_v$: Overall focal length of the second image-forming optical system in the plane of subscan direction; and $f$: Overall focal length of the second-image forming optical system in the plane of main scan direction.

This conditional formula defines the ratio of the overall focal lengths of the second image-forming optical system in the planes of the subscan and main scan directions. If the ratio is smaller than the lower limit of the conditional formula, the absolute value of image magnification between the reflective deflection surface 4 and scanning surface 7 becomes too large in the plane of the subscan direction, magnifying the influence of positional accuracy of the reflective deflection surfaces on the imaging performance quality and thus imposing a requirement of extremely high positional accuracy on the reflective deflection surfaces. In addition, the field curvature is magnified to such a degree as to make it difficult to maintain a uniform spot size on the scanning surface 7. In case the ratio is greater than the upper limit of the conditional formula, the lens elements 5 and 6 of the second image-forming optical system are enlarged or shifted to positions closer to the scanning surface 7, so that, even if the scanner itself were made compact in construction, the increase in size of the lens elements 5 and 6 of the second optical system would result in an increase in production cost.

Hereafter, the optical beam scanner of invention is illustrated by a number of embodiments.

Figure 2A:
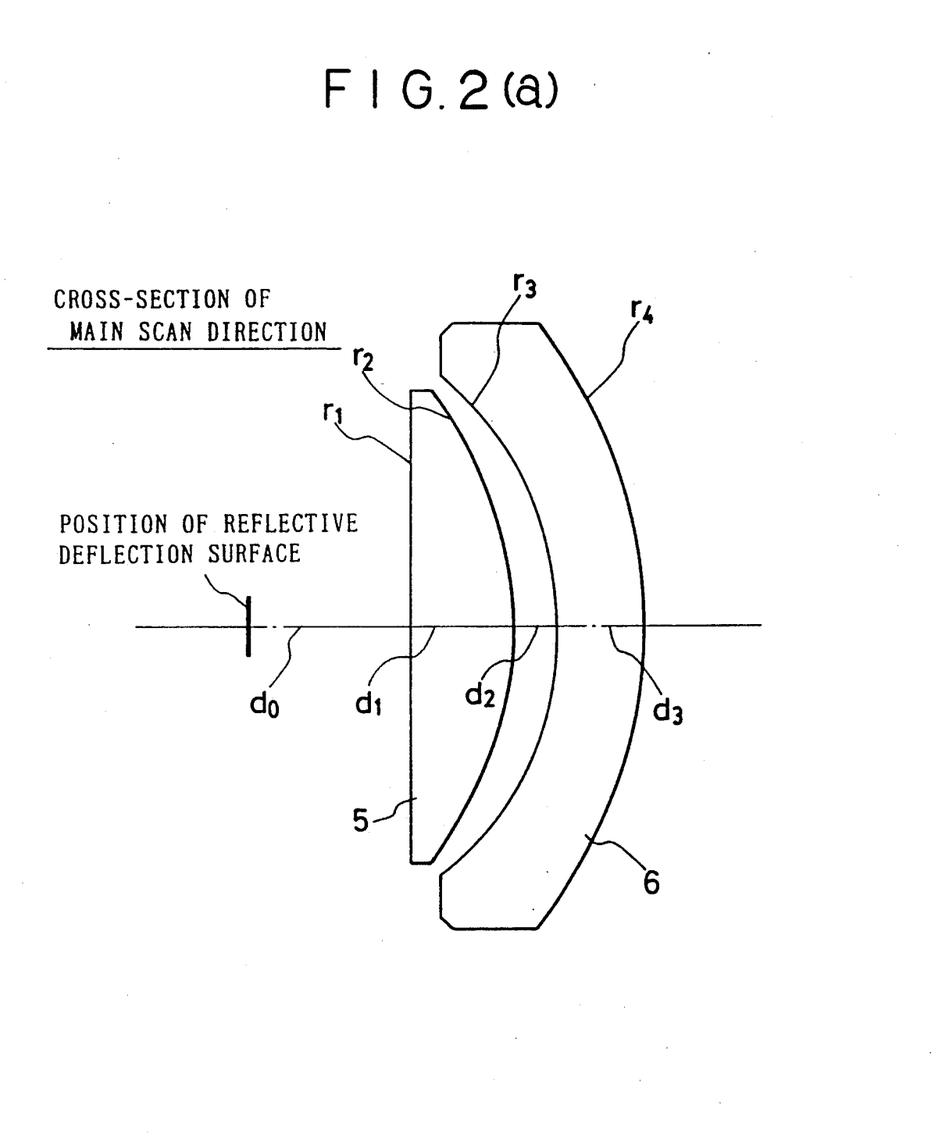
FIGS. 2(a), 2(b) and 2(c) are schematic illustrations of the lens arrangement of the second image-forming optical system.
Figure 2B:
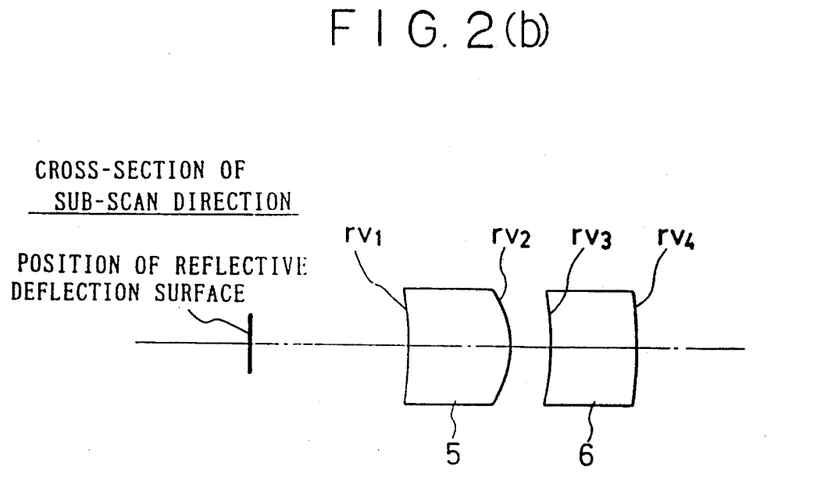

In a section in the transverse main scan direction, the second optical system is composed of a positive lens 5 having a convex surface $r_2$ on the side of the scanning surface 7 and a negative meniscus lens 6 having a convex surface $r_4$ on the side of the scanning surface 7 as seen in FIG. 2(a) which shows a basic lens construction of the second optical system in a section in the main scan direction. On the other hand, in a section in the subscan direction, the second optical system is composed of a positive meniscus lens 5 having a convex surface $rv_2$ on the side of the scanning surface 7 and a lens 6 having a concave or straight surface $rv_3$ on the side of the deflector 3 and a convex or straight surface $rv_4$ on the side of the scanning surface 7 as seen in FIG. 2(b) which shows a basic lens construction of the second optical system in a section in the subscan direction.

In the following embodiments, various notations are used for the characteristic factors as indicated below.

m: Surface number counted consecutively from the object side;

r: Radius of curvature of a lens in the plane of main scan direction;

$r_v$: Radius of curvature of a lens in the plane of subscan direction;

d: Thickness of a lens or air space between lenses;

n: Index of refraction of a lens at the wavelength of 780 nm;

$d_o$: Distance from the reflective deflection surface to the surface #1 of the lens 5 of the second optical optical system;

f: Overall focal length of the second optical system in the plane of main scan direction;

$f_v$: Overall focal length of the second optical system in the plane of subscan direction; and Bf: Overall back focal length of the second optical system in the plane of main scan direction.

In the aberration diagrams of FIGS. 3 to 12, the distortion is plotted on the basis of a value as defined by the following formula.

$$\{(H-f\theta)/(f\theta)\} \times 100(\%)$$

wherein

H: Real image height at the scan angle $\theta$;

f: Overall focal length of the second optical system in the plane of main scan direction; and $\theta$: Scan angle (unit=radian).

Embodiment 1]

Figure 2C:
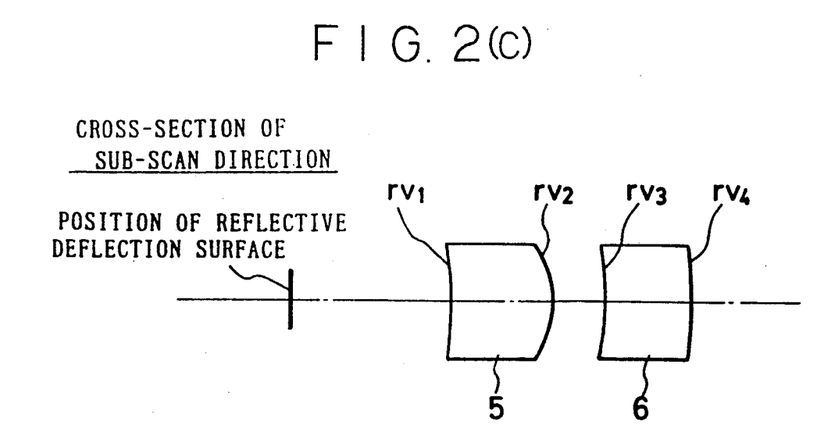

In this embodiment, the first singular lens element 5 is provided with a first toric surface and a second toric surface successively from the side of the deflector 3 in the basic lens arrangement shown in FIG. 2, while the second singular lens element 6 is provided with a first spherical surface and a second spherical surface likewise successively from the side of the deflector 3. The particulars of Embodiment 1 are as indicated below.

| m | r | $r_v$ | d | n |
|---|---|---|---|---|
| 1 | −269.967 | −27.398 | 12.03 | 1.71222 |
| 2 | −42.970 | −10.674 | 9.13 | |
| 3 | −23.315 | −23.315 | 10.91 | 1.76593 |
| 4 | −30.116 | −30.116 | | |

Figure 3:
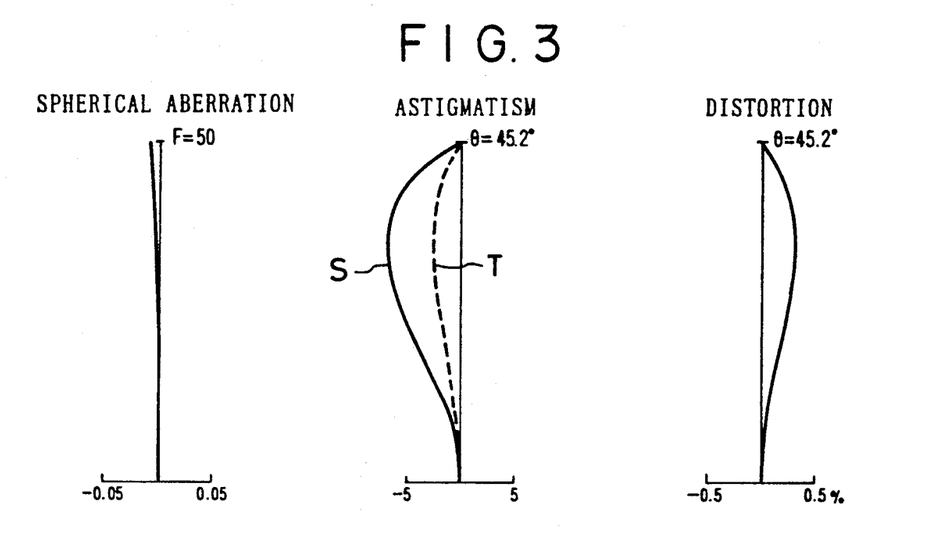
FIG. 3 shows aberration diagrams for Embodiment 1 of the invention.

$d_o = 17.30$  Half field angle $\theta = 45.2°$
$f = 100$  Wavelength $\lambda = 780$ nm
$f_v/f = 0.2324$  F/NO: 50
$Bf = 98.08$ Shown in FIG. 3 are aberration diagrams of this lens construction, in which the diagrams of spherical aberration and distortion indicate the degree of aberration in the plane of the transverse main scan direction. In the diagram of astigmatism, the reference characters S and T indicate the image surfaces in the subscan direction and in the transverse main direction, respectively. The aberration diagrams of FIGS. 4 to 12 show the respective aberrations in the same way.

[Embodiment 2]

Figure 4:
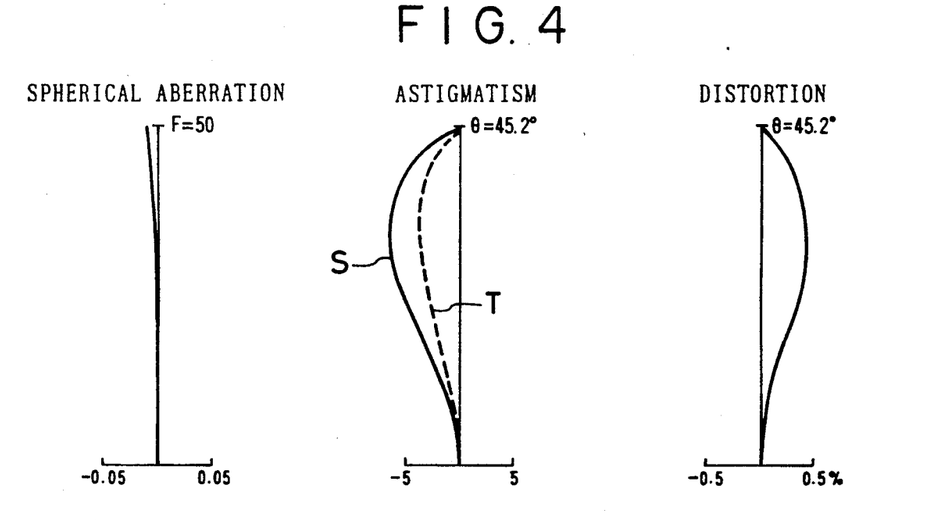
FIG. 4 shows aberration diagrams for Embodiment 2 of the invention.

In this embodiment, the first singular lens element 5 is provided with a cylindrical surface and a toric surface successively from the side of the deflector 3 in the basic lens arrangement shown in FIG. 2, while the second singular lens element 6 is provided with a first spherical surface and a second spherical surface likewise successively from the side of the deflector 3. The particulars of Embodiment 2 are as indicated below, and its aberration diagrams are shown in FIG. 4.

| m | r | $r_v$ | d | n |
|---|---|---|---|---|
| 1 | ∞ | −30.424 | 14.28 | 1.71222 |
| 2 | −47.135 | −11.365 | 3.61 | |
| 3 | −36.140 | −36.140 | 10.90 | 1.76593 |
| 4 | −50.073 | −50.073 | | |

$d_o = 18.04$  Half field angle $\theta = 45.2°$
$f = 100$  Wavelength $\lambda = 780$ nm
$f_v/f = 0.2342$  F/NO: 50
$Bf = 97.59$

[Embodiment 3]

Figure 5:
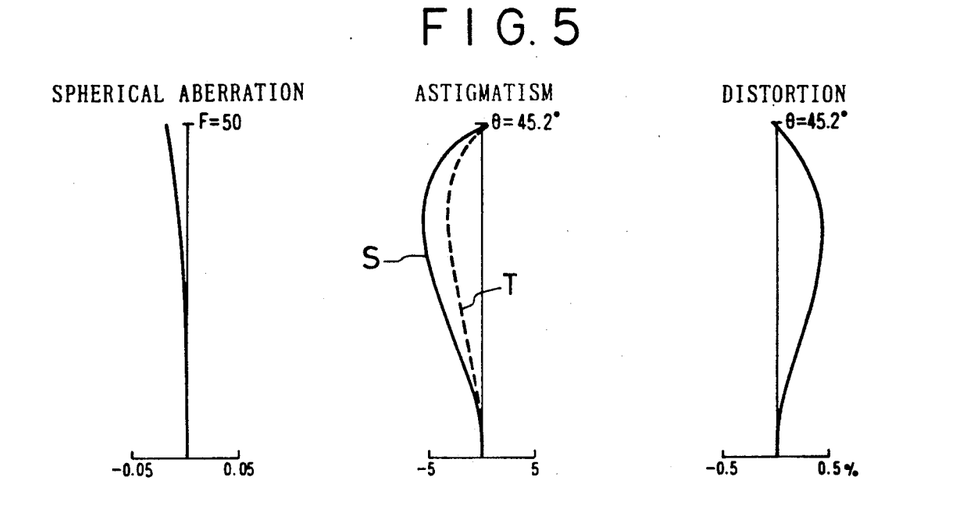
FIG. 5 shows aberration diagrams for Embodiment 3 of the invention.

In this embodiment, the first singular lens element 5 is provided with a cylindrical surface and a toric surface successively from the side of the deflector 3 in the basic lens arrangement shown in FIG. 2, while the second singular lens element 6 is provided with a first spherical surface and a second spherical surface likewise successively from the side of the deflector 3. The particulars of Embodiment 3 are as indicated below, and its aberration diagrams are shown in FIG. 5.

| m | r | $r_v$ | d | n |
|---|---|---|---|---|
| 1 | ∞ | −36.129 | 14.28 | 1.71222 |
| 2 | −46.984 | −12.082 | 4.65 | |
| 3 | −39.639 | −39.639 | 10.90 | 1.76593 |
| 4 | −56.646 | −56.646 | | |

$d_o = 20.30$  Half field angle $\theta = 45.2°$
$f = 100$  Wavelength $\lambda = 780$ nm
$f_v/f = 0.2444$  F/NO: 50
$Bf = 94.69$

[Embodiment 4]

Figure 6:
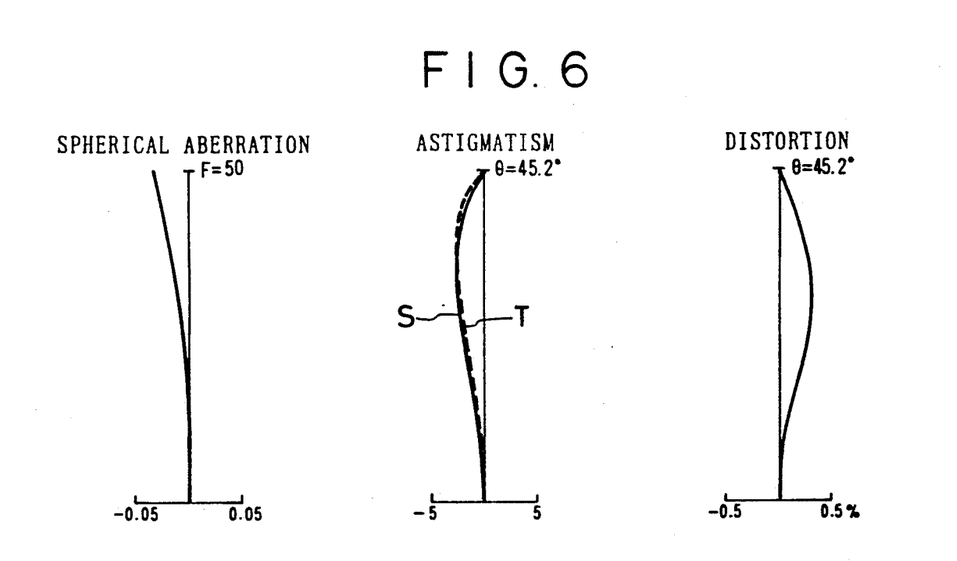
FIG. 6 shows aberration diagrams for Embodiment 4 of the invention.

In this embodiment, the first singular lens element 5 is provided with a cylindrical surface and a toric surface successively from the side of the deflector 3 in the basic lens arrangement shown in FIG. 2, while the second singular lens element 6 is provided with a first spherical surface and a second spherical surface likewise successively from the side of the deflector 3. The particulars of Embodiment 4 are as indicated below, and its aberration diagrams are shown in FIG. 6.

| m | r | $r_v$ | d | n |
|---|---|---|---|---|
| 1 | ∞ | −56.853 | 16.53 | 1.71222 |
| 2 | −54.469 | −16.560 | 12.79 | |
| 3 | −49.334 | −49.334 | 6.32 | 1.76593 |
| 4 | −64.692 | −64.692 | | |

$d_o = 33.82$   Half field angle $\theta = 45.2°$
$f = 100$   Wavelength $\lambda = 780$ nm
$f_v/f = 0.311$   F/NO: 50
$Bf = 83.23$

[Embodiment 5]

Figure 7:
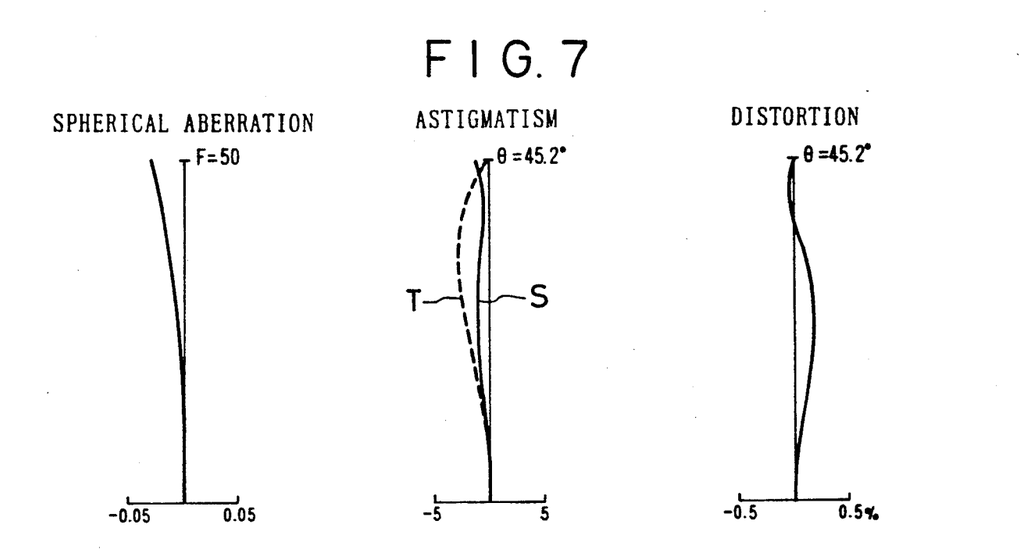
FIG. 7 shows aberration diagrams for Embodiment 5 of the invention.

In this embodiment, the first singular lens element 5 is provided with a first toric surface and a second toric surface successively from the side of the deflector 3 in the basic lens arrangement shown in FIG. 2, while the second singular lens element 6 is provided with a first spherical surface and a second spherical surface likewise successively from the side of the deflector 3. The particulars of Embodiment 5 are as indicated below, and its aberration diagrams are shown in FIG. 7.

| m | r | $r_v$ | d | n |
|---|---|---|---|---|
| 1 | 750.911 | −54.523 | 21.00 | 1.71222 |
| 2 | −56.140 | −17.644 | 14.36 | |
| 3 | −50.340 | −50.340 | 3.75 | 1.76593 |
| 4 | −70.479 | −70.470 | | |

$d_o = 37.50$   Half field angle $\theta = 45.2°$
$f = 100$   Wavelength $\lambda = 780$ nm
$f_v/f = 0.3301$   F/NO: 50
$Bf = 79.17$

[Embodiment 6]

Figure 8:
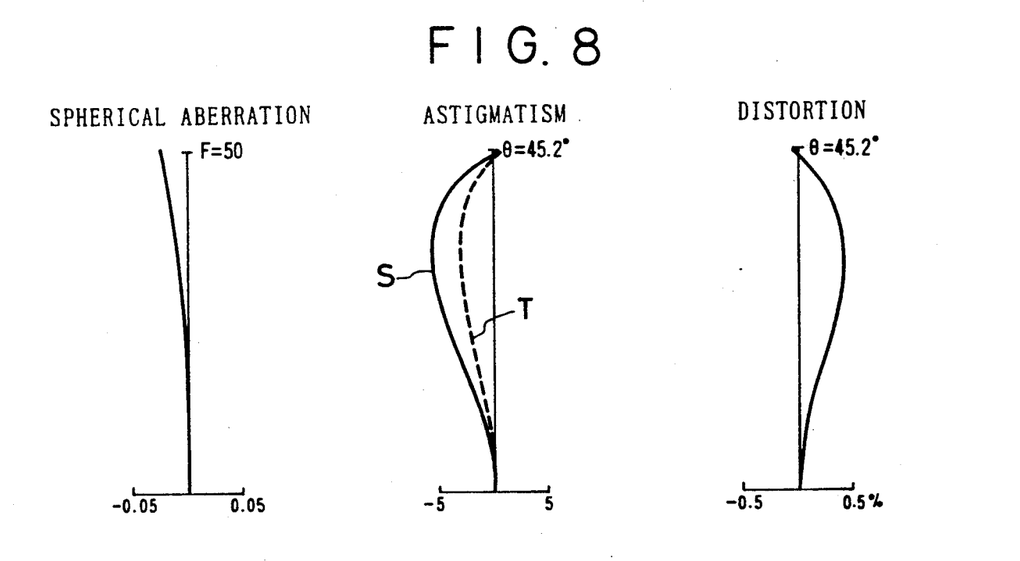
FIG. 8 shows aberration diagrams for Embodiment 6 of the invention.

In this embodiment, the first singular lens element 5 is provided with a cylindrical surface and a toric surface successively from the side of the deflector 3 in the basic lens arrangement shown in FIG. 2, while the second singular lens element 6 is provided with a spherical surface and a cylindrical surface likewise successively from the side of the deflector 3. The particulars of Embodiment 6 are as indicated below, and its aberration diagrams are shown in FIG. 8.

| m | r | $r_v$ | d | n |
|---|---|---|---|---|
| 1 | ∞ | −44.855 | 13.53 | 1.71222 |
| 2 | −46.678 | −10.420 | 5.41 | |
| 3 | −39.487 | −39.487 | 12.03 | 1.76593 |
| 4 | −57.102 | ∞ | | |

$d_o = 20.30$   Half field angle $\theta = 45.2°$
$f = 100$   Wavelength $\lambda = 780$ nm
$f_v/f = 0.2192$   F/NO: 50
$Bf = 93.48$

[Embodiment 7]

Figure 9:
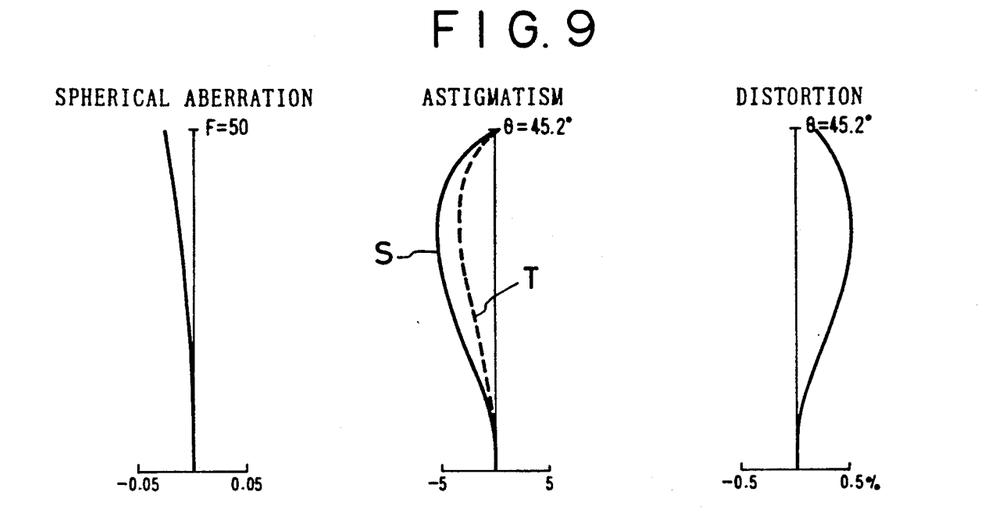
FIG. 9 shows aberration diagrams for Embodiment 7 of the invention.

In this embodiment, the first singular lens element 5 is provided with a cylindrical surface and a toric surface successively from the side of the deflector 3 in the basic lens arrangement shown in FIG. 2, while the second singular lens element 6 is provided with a first cylindrical surface and a second cylindrical surface likewise successively from the side of the deflector 3. The particulars of Embodiment 7 are as indicated below, and its aberration diagrams are shown in FIG. 9.

| m | r | $r_v$ | d | n |
|---|---|---|---|---|
| 1 | ∞ | −33.649 | 14.21 | 1.71222 |
| 2 | −45.242 | −13.189 | 4.80 | |
| 3 | −39.902 | ∞ | 10.81 | 1.76593 |
| 4 | −59.776 | ∞ | | |

$d_o = 20.30$   Half field angle $\theta = 45.2°$
$f = 100$   Wavelength $\lambda = 780$ nm
$f_v/f = 0.2363$   F/NO: 50
$Bf = 93.67$

[Embodiment 8]

Figure 10:
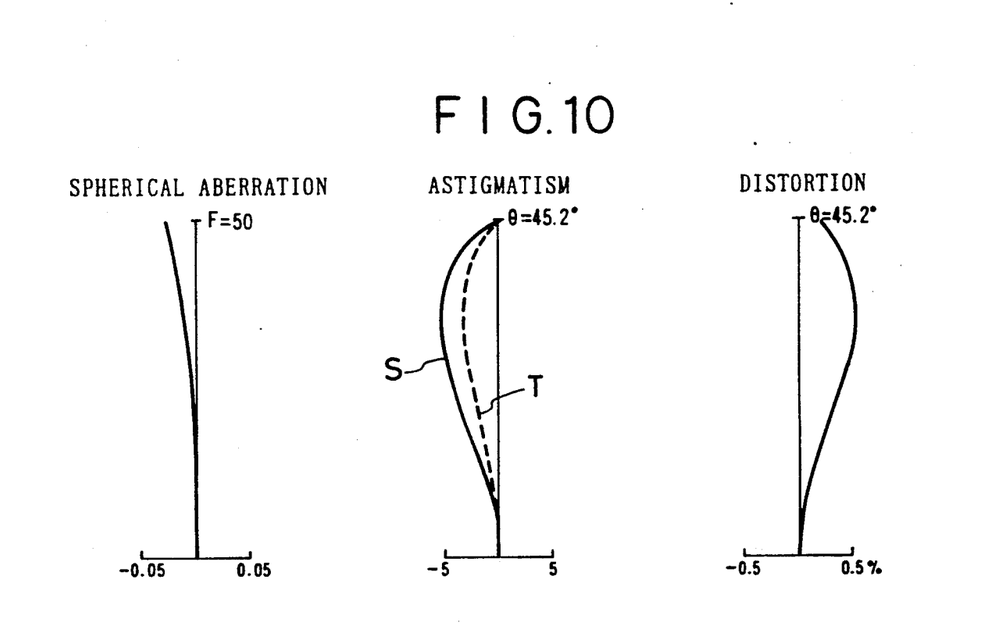
FIG. 10 shows aberration diagrams for Embodiment 8 of the invention.

In this embodiment, the first singular lens element 5 is provided with a cylindrical surface and a toric surface successively from the side of the deflector 3 in the basic lens arrangement shown in FIG. 2, while the second singular lens element 6 is provided with a cylindrical surface and a spherical surface likewise successively from the side of the deflector 3. The particulars of Embodiment 8 are as indicated below, and its aberration diagrams are shown in FIG. 10.

| m | r | $r_v$ | d | n |
|---|---|---|---|---|
| 1 | ∞ | −32.171 | 14.27 | 1.71222 |
| 2 | −44.830 | −16.674 | 4.79 | |
| 3 | −39.845 | ∞ | 10.90 | 1.76593 |
| 4 | −60.348 | −60.348 | | |

$d_o = 20.30$   Half field angle $\theta = 45.2°$
$f = 100$   Wavelength $\lambda = 780$ nm
$f_v/f = 0.2530$   F/NO: 50
$Bf = 93.55$

[Embodiment 9]

Figure 11:
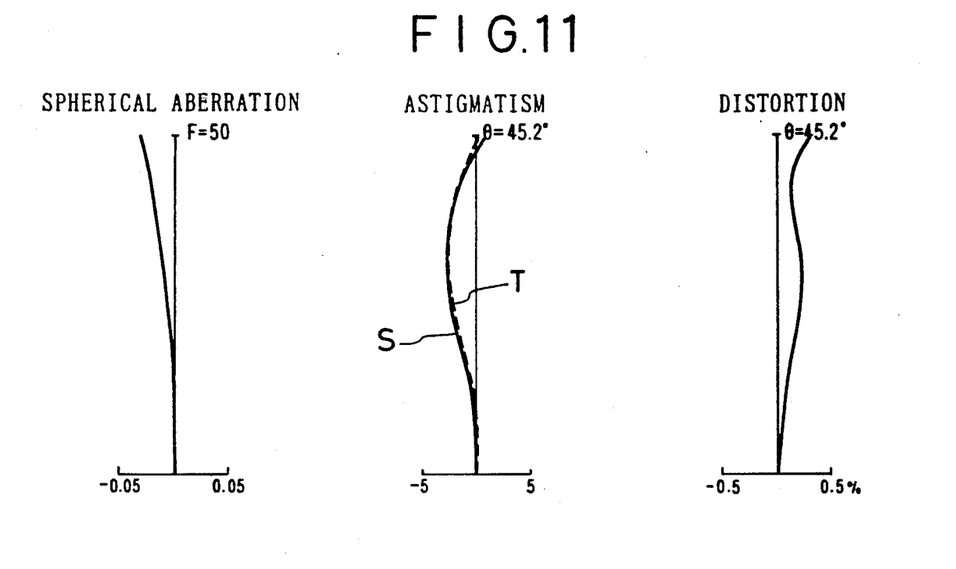
FIG. 11 shows aberration diagrams for Embodiment 9 of the invention.

In this embodiment, the first singular lens element 5 is constituted by a first toric surface and a second toric surface successively from the side of the deflector 3 in the basic lens arrangement shown in FIG. 2, while the second singular lens element 6 is constituted by a cylindrical surface and a spherical surface successively likewise from the side of the deflector 3. The particulars of Embodiment 9 are as indicated below, and its aberration diagrams are shown in FIG. 11.

| m | r | $r_v$ | d | n |
|---|---|---|---|---|
| 1 | 752.737 | −40.025 | 21.05 | 1.71222 |
| 2 | −55.479 | −23.432 | 14.02 | |
| 3 | −49.772 | ∞ | 3.76 | 1.76593 |
| 4 | −70.464 | −70.464 | | |

$d_o = 37.59$   Half field angle $\theta = 45.2°$
$f = 100$   Wavelength $\lambda = 780$ nm
$f_v/f = 0.3434$   F/NO: 50
$Bf = 79.43$

[Embodiment 10]

Figure 12:
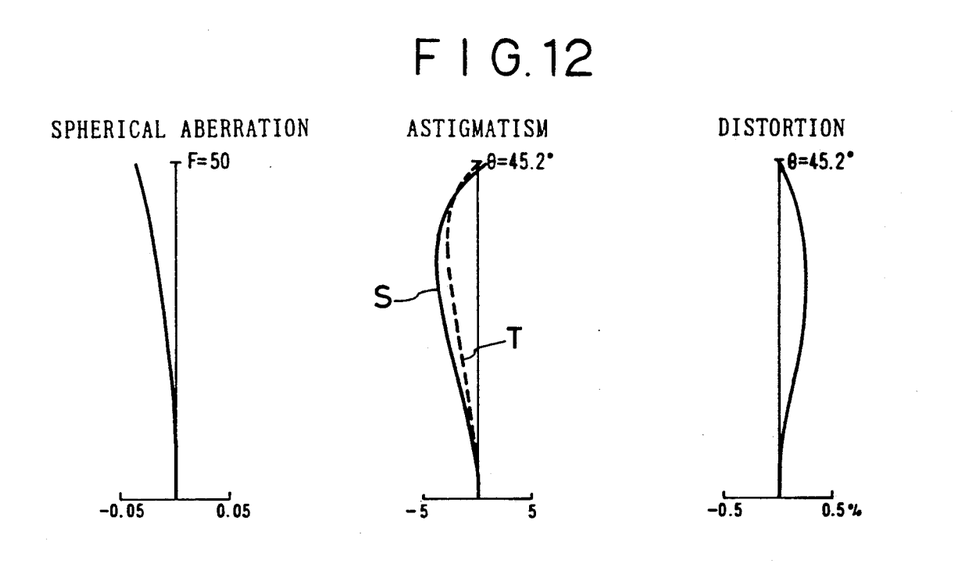
FIG. 12 shows aberration diagrams for Embodiment 10 of the invention.

In this embodiment, the first singular lens element 5 is constituted by a cylindrical surface and a toric surface successively from the side of the deflector 3 in the basic lens arrangement shown in FIG. 2, while the second singular lens element 6 is constituted by a cylindrical surface and a spherical surface successively likewise from the side of the deflector 3. The particulars of Embodiment 10 are as indicated below, and its aberration diagrams are shown in FIG. 12.

| m | r | $r_v$ | d | n |
|---|---|---|---|---|
| 1 | ∞ | −21.490 | 15.41 | 1.71222 |
| 2 | −60.796 | −14.066 | 52.29 | |
| 3 | −50.571 | ∞ | 15.04 | 1.76593 |
| 4 | −62.269 | −62.269 | | |

$d_o = 28.66$  Half field angle $\theta = 45.2°$
$f = 100$  Wavelength $\lambda = 780$ nm
$f_v/f = 0.4135$  F/NO: 50
$Bf = 33.77$ In all of the foregoing embodiments, the back focal length of the lens system in the scanning plane is shorter than the focal length, permitting to reduce the light path length from the reflective deflection surface 4 to the scanning surface 7. The aberration diagrams show that the respective aberrations are in a practically acceptable range.

What is claimed is:

1. An optical beam scanner of the type including a first image-forming optical system arranged to form an image of a light beam from a light source linearly on or in the vicinity of a reflective deflection surface of a deflector, and a second image-forming optical system arranged to form an image of the deflected light beam from said deflector on a scanning surface; characterized in that said second image-forming optical system comprises successively from the side of said deflector:

a first singular lens element in the form of a positive meniscus, wherein in a first cross-section of the first singular lens element taken in a plane extending parallel to a main scan direction of said light beam, the first cross-section of the first singular lens element has a convex curve facing the scanning surface, and wherein in a second cross-section of the first singular lens element taken in a plane extending parallel to a subscan direction which is perpendicular to said main scan direction, the second cross-section of the first singular lens element has a convex curve facing said scanning surface, and wherein said first singular lens element has a toric surface at least one the side facing the deflector;

a second singular lens element in the form of a negative meniscus, wherein in a first cross-section of the second singular lens element taken in a plane extending parallel to the main scan direction, the first cross-section of the second singular lens element has a convex curve facing said scanning surface and a concave curve facing said deflector, and wherein in a second cross-section of the second singular lens element taken in a plane extending parallel to said subscan direction, the second cross-section of the second singular lens element has either a convex curve or a straight line facing said scanning surface and either a concave curve or straight line facing said deflector.

2. An optical beam scanner as defined in claim 1, wherein said second image-forming optical system is arranged to satisfy the condition of $0.2 < f_v/f < 0.5$ where f is the overall focal length of said second optical system in the plane of said main scan direction and $f_v$ is the overall focal length of said second optical system in the plane of said subscan direction.

3. An optical beam scanner as defined in claim 1, wherein said first singular lens element is constituted by a cylindrical surface and a toric surface successively from the side of said deflector, and said second singular lens element is constituted by a first spherical surface and a second spherical surface successively from the side of said deflector.

4. An optical beam scanner as defined in claim 1, wherein said first singular lens element is constituted by a cylindrical surface and a toric surface successively from the side of said deflector, and said second singular lens element is constituted by a spherical surface and a cylindrical surface successively from the side of said deflector.

5. An optical beam scanner as defined in claim 1, wherein said first singular lens element is constituted by a cylindrical surface and a toric surface successively from the side of said deflector, and said second singular lens element is constituted by a cylindrical surface and a spherical surface successively from the side of said deflector.

6. An optical beam scanner as defined in claim 1, wherein said first singular lens element is constituted by a cylindrical surface and a toric surface successively from the side of said deflector, and said second singular lens element is constituted by a first cylindrical surface and a second cylindrical surface successively from the side of said deflector.

7. An optical beam scanner as defined in claim 1, wherein said first singular lens element is constituted by a first toric surface and a second toric surface successively from the side of said deflector, and said second singular lens element is constituted by a first spherical surface and a second spherical surface successively from the side of said deflector.

8. An optical beam scanner as defined in claim 1, wherein said first singular lens element is constituted by a first toric surface and a second toric surface successively from the side of said deflector, and said second singular lens element is constituted by a cylindrical surface and a spherical surface successively from the side of said deflector.

* * * * *